July 5, 1966
E. HANSEN
3,258,996
BORING MILL
Filed Feb. 15, 1965
3 Sheets-Sheet 1
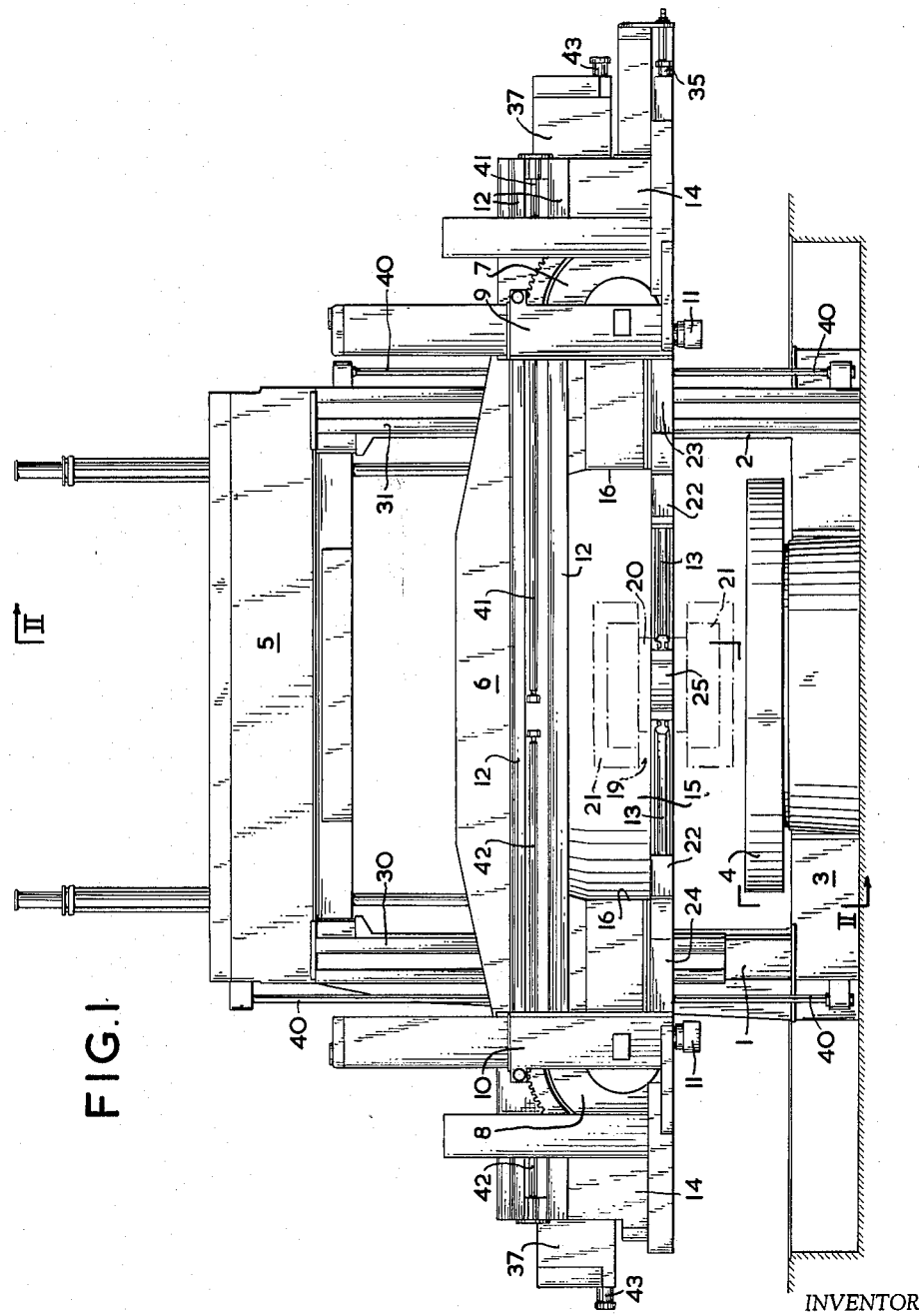
INVENTOR
Erik Hansen
BY
ATTORNEYS

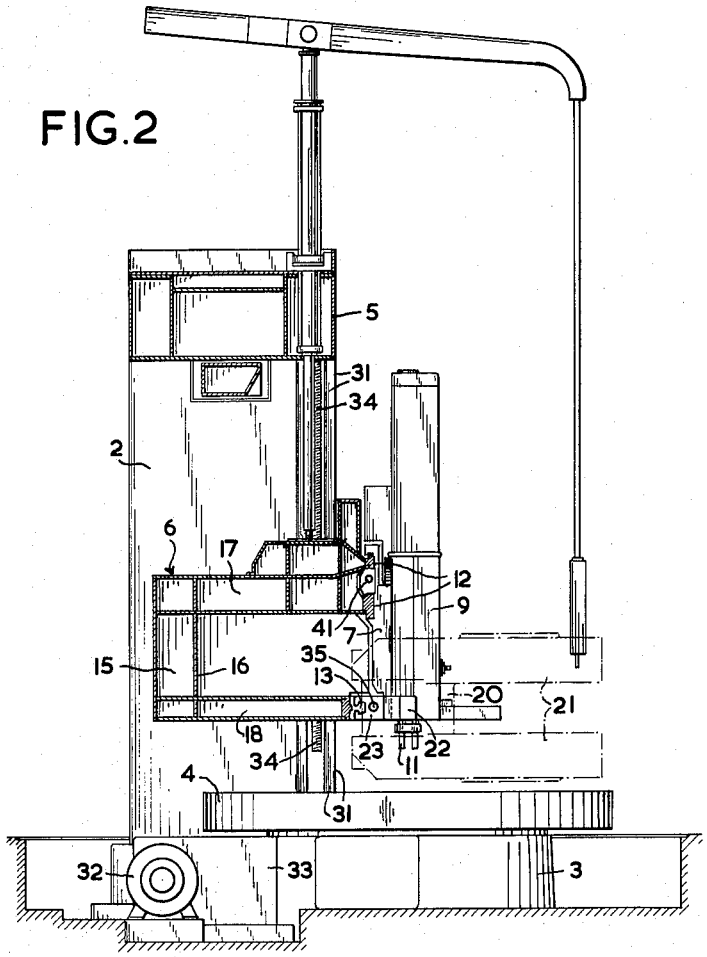

July 5, 1966 E. HANSEN 3,258,996
BORING MILL
Filed Feb. 15, 1965 3 Sheets-Sheet 3
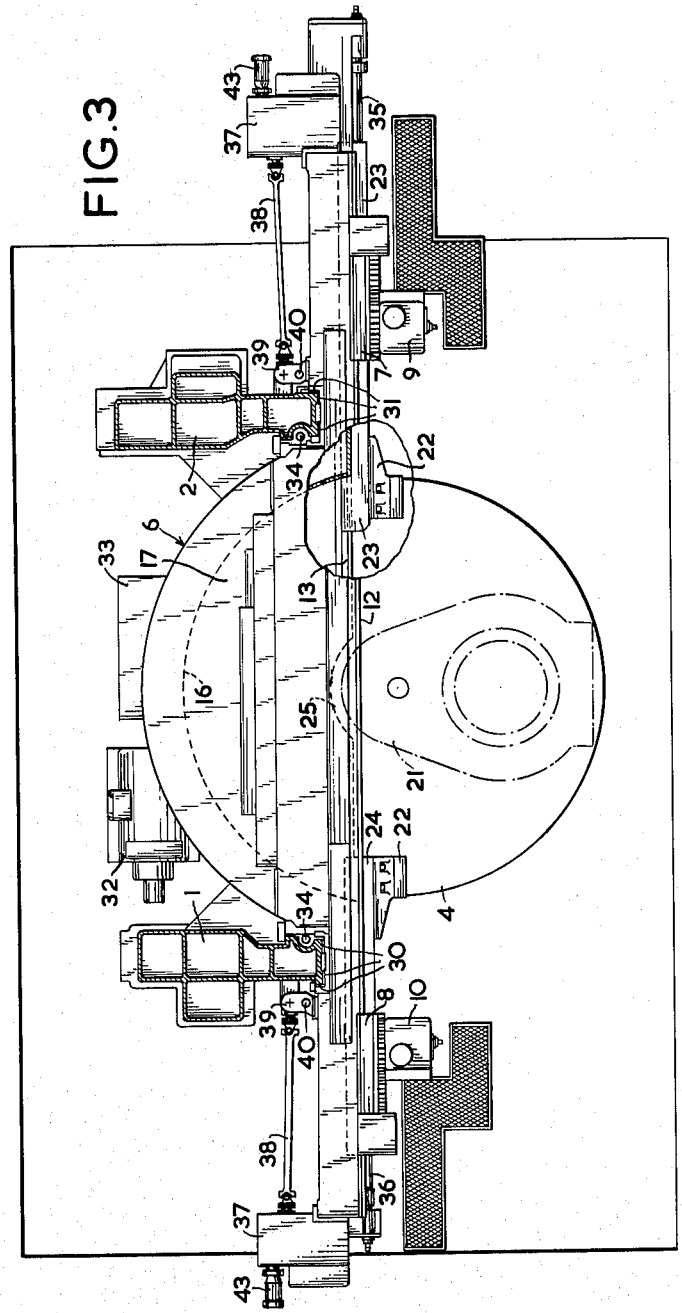
INVENTOR
Erik Hansen
BY Stevens, Davis, Miller & Mosher
ATTORNEYS

United States Patent Office 3,258,996
Patented July 5, 1966

3,258,996
BORING MILL
Erik Hansen, Gentofte, Denmark, assignor to Aktieselskabet Burmeister & Wains Maskin-OG Skibsbyggeri, Copenhagen, Denmark, a company of Denmark
Filed Feb. 15, 1965, Ser. No. 432,677
Claims priority, application Denmark, Feb. 28, 1964, 1,002/64
5 Claims. (Cl. 77—1)

The invention relates to a boring mill, particularly for machining double cranks, and comprising a cross slide or arm, movable in vertical direction along at least one vertical column, and having upper and lower guideways for one or more main saddles, on which at least one tool post can be mounted.

It is an object of the invention to provide a boring mill which is particularly suitable for machining of double cranks or crank throws for so-called semi-built crank shafts, each consisting of a crank pin with two associated crank arms or webs, and other work pieces with considerable overhang.

When double cranks, whether cast or forged, have been machined on standard boring mills of known design, it has been necessary to provide the boring mill with special equipment for setting up the machining tools, especially whenever double cranks for bigger crank shafts are involved, since normal boring mills of corresponding size are designed in such a manner that the machining cannot be carried out at all without such auxiliary equipment.

As a rule, the said auxiliary equipment for the fitting of tool posts, slides, etc. is arranged so that it has to be mounted and subsequently dismounted whenever double cranks are to be machined on the crank pin and on the inner surfaces of the crank arms or webs, which delays the operation and enhances the costs. Moreover, the rigidity of this equipment is comparatively poor, so that tools made of cemented carbides or high-speed steel cannot be fully utilized due to deflections of the tool posts and the risk of vibrations, especially at the intermittent cutting which frequently appears in the machining of double cranks and similar work-pieces. The trouble of mounting and dismounting the auxiliary equipment may be avoided to some extent by mounting the equipment on the boring mill in such a manner that it can be swivelled between an operative and an inoperative position. Such an arrangement, however, frequently involves further reduction of the rigidity, and it may also be difficult or impossible to design the equipment so that it will not hamper the functioning and attendance of the boring mill when the equipment is in its inoperative position.

According to the present invention, the said drawbacks are overcome by providing, in the web of the cross slide or arm of the boring mill between the two guideways for the main saddle or saddles, a backward extending recess of such a depth that a work piece with substantial overhang set up on the face plate or table of the boring mill, for example a double crank, can swing freely through the recess during the rotation of the table.

The invention makes it possible, prior to the performance of a machining operation, to lower the cross slide or arm to such an extent towards the table that the lower guideway for the saddle is located entirely between the webs of the double crank, i.e. on a level with the crank pin and the inside surface of the webs, which are to be machined by means of the tool mounted on the saddle. Thereby the overhang of this tool in relation to its attachment surfaces is reduced so much that a far more rigid set-up is obtained and consequently far heavier cuts are possible.

According to a feature of the invention, an auxiliary saddle may be incorporated between the lower horizontal guideway of the cross slide or the arm and at least one main saddle, the said auxiliary saddle being guided by the guideway and movable in relation to the main saddle and capable of being clamped to the latter, the auxiliary saddle being adapted to carry a tool post. By the use of such a saddle it is obtained that the main saddle, to which the auxiliary saddle is secured during the machining operations, is relied upon, with its upper as well as its lower guideway, to guide and retain the auxiliary saddle with the tool post. The adjustability of the auxiliary saddle in relation to the main saddle makes it possible to adapt the overhang of the auxiliary saddle relative to the main saddle, according to the overhang of the work piece, so that the main saddle can be moved as close as possible to the work piece. When the auxiliary saddle is displaced to the opposite side in relation to the main saddle, if necessary after removal of the tool post, two main saddles mounted on the same cross slide can be moved close to each other as in normal boring mills.

A preferred embodiment of the invention will be described in more detail below with reference to the accompanying drawings, in which FIG. 1 is an elevation of the boring mill,
FIG. 2 is a vertical section taken on the line II—II of FIG. 1, and
FIG. 3 is a plan view of the boring mill with certain parts shown in section.

Generally, the boring mill shown in FIG. 1 is an ordinary double column machine having two vertical uprights or columns 1 and 2 secured to a base frame 3 that carries the rotary face plate or table 4 of the machine. At the top the columns 1 and 2 are rigidly connected to form a portal by means of a horizontal top tie beam 5.

The columns 1 and 2 are provided with guideways 30 and 31, respectively, along which a cross slide 6 can be displaced vertically by means of a mechanism including a drive motor and gearbox, not shown, in the hollow beam 5 and two lead screws 34. The cross slide 6 carries two main saddles 7 and 8, each associated with a swivel slide 9 and 10, respectively. Each of the swivel slides is provided with a tool post 11 detachably secured to a ram which is longitudinally displaceable in the swivel slide. The design and shape of the saddles and swivel slides as well as of the tool posts and the mutual mobility and adjustability of these parts do not in themselves constitute any part of the invention and are, therefore, not shown in more detail.

The two saddles 7 and 8 are guided in relation to the cross slide 6 by means of two parallel guideways on the cross slide, viz. an upper guideway 12 and a lower guideway 13. These guideways extend over the entire length of the cross slide 6, and they are interconnected by means of a vertical web 14, which at the ends of the cross slide 6 is located in front of the columns 1 and 2 as commonly used for boring mills, whereas according to the invention the central part 15 of the web is retracted between the columns 1 and 2, so that in this place, above the table 4, a recess is formed between the two guideways 12 and 13, which recess in the embodiment shown is defined on its forward side by a surface 16, which forms part of a vertical, circular cylinder having substantially the same radius as the table 4 and being concentric therewith. At the top and bottom the central part 15 of the vertical web is connected with the guideways 12 and 13 by means of horizontal walls 17 and 18, which thus are shaped substantially as circle segments.

From FIG. 3 and FIG. 1 wherein the cross slide 6 is shown in the position it takes up at the machining of a double crank 19 fixed on the table 4 and consisting of a crank pin 20 and two adjacent arms or webs 21, it will be seen that the design of the cross slide 6 described above enables said slide 6 to be lowered so close to the table 4 that its lower guideway 13 will be located in the space between the two webs 21. During the rotation of the table the upper web can thus swing freely through the recess in the web 14 of the cross slide defined at the rear by the surface 16.

The tool, not shown in the drawing, for machining the surface of the crank pin 20 and the inner surfaces of the webs 21, will be fitted in a tool post 22, which is attached to an auxiliary saddle 23, which on its lower surface has a guide cooperating with the guideway 13 of the cross slide 6. The auxiliary saddle, and thereby also its guide, has such a length that in the position shown to the right of FIG. 1 it extends through the saddle 7 past the extreme right-hand edge of same. A corresponding auxiliary saddle 24 is provided in connection with the other saddle 8, and in the left-hand half of FIG. 1 the auxiliary saddle 24 is shown in a position, where the outermost end thereof is flush with the outermost edge of the saddle 8. A tool post 22 is shown mounted on the saddle 24.

For displacing the auxiliary saddle 23 and 24 along the guideway 13 there are provided lead screws 35 and 36, respectively, and at their ends the lead screws are shown as having a square head for receiving a crank handle permitting manual cross feed of the saddles. A power drive is furthermore provided for the lead screws 35 and 36, providing for power feed of the auxiliary saddles and the main saddles secured thereto, and this power drive comprises gearboxes 37 mounted at the ends of the cross slide 6. Each gearbox 37 has an output shaft, not shown, which is drivingly connected with the respective lead screw 35 or 36. The gearbox 37 has an input shaft, which is driven through a shaft 38 and a gear transmission located in a housing 39 secured to the cross slide 6, from a radical spline shaft 40 extending along each column 1, 2. The vertical shafts 40 are driven from the table 4 so that the power feeds are related to the rotation of the table.

The output shafts, not shown, of the two gearboxes 37 are furthermore drivingly connected to two shafts 41, 42 which are rotatably supported between the two portions of the upper guideway 12 of the cross slide 6, and the power drive is transmitted through the main saddles to the rams of the swivel slides supporting the tool posts 11. In order to provide for rapid traverse or other feed of the saddles and rams, independent of the rotation of the table 4, a separate motor 43 is provided in connection with each gearbox 37.

The two auxiliary saddles 23 and 24 can be displaced longitudinally relative to the associated saddles 7 and 8 and clamped in selected position in relation thereto by means of clamping devices, not shown. When the auxiliary saddle and the associated main saddle are clamped together they act as one unit, whereby inter alia the auxiliary saddle guides the main saddle in relation to the lower guideway 13 of the cross slide 6 during the displacement therealong effected by means of the lead screws 35 and 36. Further it is obtained that when the auxiliary saddle is in the position shown to the right in FIG. 1 and carries a machining tool, it is guided by both guideways 12 and 13 of the cross slide 6, so that the rigidity of the tool set-up will be by far better than if the auxiliary saddle had been guided only by the lower guideway 13.

In the middle of the cross slide 6, a circular recess 25 concentric with the table 4 is provided in the lower guideway 13 and this recess enables the cross slide and consequently the guideways for the saddles to be moved still closer to the centre of the table, whereby the overhang of the machining tools is further reduced. The recess 25 and the interruption of the lower guideway 13 for the saddles caused thereby will in themselves involve an impairment of the support and guiding of the saddles at normal boring mill operations upon small diameter work pieces, e.g. at boring jobs where the cross slide and the saddle take up the position shown on the left in FIG. 1. Thanks to the provision of the auxiliary saddles 23 and 24 this drawback can be overcome by displacing the auxiliary saddle concerned in relation to its main saddle in such a manner that it engages the guideway 13 on both sides of the recess 25, thus bridging the gap across the recess.

The invention provides a boring mill which without mounting or dismounting of parts can readily be readjusted from carrying out normal boring mill operations to the machining of double cranks and vice versa, and the machine and its tool set-ups possess substantial rigidity also when carrying out the last-mentioned operations. When siwtching over from the machining of double cranks to other jobs, it may be necessary to dismount the tool post on the auxiliary saddle, if the two main saddles are to work closely together, but no other changes will be required.

The tool posts shown schematically in the drawings may be of any suitable design, such as revolving turrets for the set-up of several tools. The tool posts 11 may also be provided with means for copy turning, as known per se. As compared with a normal boring mill without the recess in the cross slide, characteristic of the invention, the said slide is shown extended slightly at each end, among other things with a view to the guiding of the auxiliary saddles and to the arrangement of the feed mechanisms for the travel of the saddles along the cross slide. In the drawing the cross slide and the columns are shown as welded components, but they may also be cast, if preferred. The balancing of the cross slide 6 can be effected by any suitable, conventional means, such as counter balancing weights located in the hollow columns or hydraulic means as shown.

Even if the invention is illustrated in connection with a double column boring mill, it can also be used with single column boring mills. In such boring mills the face plate or table can frequently be displaced longitudinally, parallel to the arm guides for the saddle, and for this reason the centre of the table may be offset with respect to the centre of the recess between the two horizontal guideways in the arm of the boring mill. It may be appropriate, therefore, to make the recess with a bigger radius than that of the table, e.g. up to approximately 50% bigger, whereby also work pieces with maximum swing may pass through the recess, even if the table is offset laterally relative to the centre of the recess during the machining operation.

The mechanism for the vertical displacement of the cross slide or the arm including the lead screws 34 can advantageously be designed as a feed mechanism, whereby the performance of certain turning operations, e.g. the machining of rounded internal corners will be rendered possible or facilitated.

The two horizontal guideways on the cross slide of the boring mill may be of equal lengths, although the necessary length of the lower guideway will normally be greater than the length of the upper guideway due to the increased travel of the auxiliary saddle, which engages the lower guideway. In the drawings, this feature is shown at the right hand end of the lower guideway 13. However, if it is not required that e.g. one saddle must be able to overlap the recess in the lower guideway of the cross slide, it will suffice to provide a shorter travel for this saddle, and thereby a shorter length can also be allowed for the lower guideway of the cross slide, as shown at the left hand end of FIGS. 1 and 3.

I claim:

1. A boring mill, particularly for machining double cranks, comprising a rotary table, means for supporting said table, means for rotating said table, at least one vertical column located ajacent to said table, a cross slide or arm vertically displaceable along said column and means for effecting vertical displacement of said cross slide or arm, said cross slide having upper and lower guideways and a substantially vertical web interconnecting said guideways, said web having a recess extending backward with respect to said table and of such a depth that a work piece with a substantial overhang, e.g. a double crank set up on said table, can swing freely through said recess during the rotation of the table, at least one main saddle horizontally displaceable along said guideways of said cross-slide or arm and means for horizontally displacing said saddle along said guideways, and means for mounting a tool post on said saddle.

2. A boring mill according to claim 1, wherein said recess is in the shape of an arc of a circle having approximately the same radius as said table.

3. A boring mill according to claim 1, wherein an auxiliary saddle is incorporated between the lower horizontal guideway of said cross slide or arm and at least one main slide, the said auxiliary saddle being guided by said guideway and movable in relation to said main saddle and capable of being clamped to the latter, the auxiliary saddle being adapted to carry a tool post.

4. A boring mill according to claim 3, wherein the lower guideway of said cross slide or arm is interrupted by a recess off the centre of the table.

5. A boring mill according to claim 4, wherein said recess has the shape of an arc of a circle.

No references cited.

WILLIAM W. DYER, JR., *Primary Examiner.*
G. A. DOST, *Assistant Examiner.*